United States Patent
Nakayama et al.

(10) Patent No.: US 11,990,583 B2
(45) Date of Patent: May 21, 2024

(54) SULFIDE SOLID ELECTROLYTE AND METHOD OF PRODUCING THE SAME

(71) Applicant: Mitsui Mining & Smelting Co., Ltd., Tokyo (JP)

(72) Inventors: Yuki Nakayama, Ageo (JP); Takahiro Ito, Ageo (JP); Tsukasa Takahashi, Ageo (JP)

(73) Assignee: Mitsui Mining & Smelting Co., Ltd. (JP)

( * ) Notice: Subject to any disclaimer, the term of this patent is extended or adjusted under 35 U.S.C. 154(b) by 0 days.

(21) Appl. No.: 17/606,776

(22) PCT Filed: Dec. 25, 2020

(86) PCT No.: PCT/JP2020/048632
§ 371 (c)(1),
(2) Date: Oct. 27, 2021

(87) PCT Pub. No.: WO2021/132537
PCT Pub. Date: Jul. 1, 2021

(65) Prior Publication Data
US 2022/0263122 A1 Aug. 18, 2022

(30) Foreign Application Priority Data
Dec. 27, 2019 (JP) .................. 2019-239129

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0407* (2013.01); *H01M 4/364* (2013.01); *H01M 10/0525* (2013.01); *H01M 2300/0068* (2013.01)

(58) Field of Classification Search
CPC ......... H01M 10/0562; H01M 10/0525; H01M 4/364; H01M 4/0407; H01M 2300/0068
See application file for complete search history.

(56) References Cited

U.S. PATENT DOCUMENTS

| | | |
|---|---|---|
| 9,899,701 B2 | 2/2018 | Miyashita et al. |
| 2018/0358610 A1 | 12/2018 | Shimanuki et al. |

(Continued)

FOREIGN PATENT DOCUMENTS

| | | |
|---|---|---|
| EP | 3392934 A1 | 10/2018 |
| JP | 2001-250580 A | 9/2001 |

(Continued)

OTHER PUBLICATIONS

International Search Report (English and Japanese) and Written Opinion (English and Japanese) of the International Searching Authority issued in PCT/JP2020/048632, dated Feb. 16, 2021; ISA/JP (11 pages).

(Continued)

*Primary Examiner* — Osei K Amponsah
(74) *Attorney, Agent, or Firm* — Harness, Dickey & Pierce, P.L.C.

(57) ABSTRACT

Provided are a sulfide solid electrolyte having a small particle size and a low specific surface area; an electrode composite material, a slurry and a battery in each of which the sulfide solid electrolyte is used; and a method of producing the sulfide solid electrolyte. The sulfide solid electrolyte contains lithium (Li), phosphorus (P) and sulfur (S) elements and has: a median diameter $D_{50}$ of 0.10 μm or more and 2.0 μm or less; and a value of the formula: $(A \times B)/C$, wherein A represents a BET specific surface area ($m^2/g$), B represents a true density ($g/cm^3$), and C represents a CS value ($m^2/cm^3$), of 1.0 or more and 2.5 or less.

13 Claims, 4 Drawing Sheets

(51) Int. Cl.
    *H01M 4/36*     (2006.01)
    *H01M 10/0525*     (2010.01)

(56) References Cited

U.S. PATENT DOCUMENTS

| | | | |
|---|---|---|---|
| 2019/0319302 A1* | 10/2019 | Kintsu | H01M 10/0562 |
| 2020/0127325 A1 | 4/2020 | Takahashi et al. | |
| 2020/0220208 A1* | 7/2020 | Utsuno | C01B 25/14 |
| 2021/0075058 A1 | 3/2021 | Nakayama et al. | |

FOREIGN PATENT DOCUMENTS

| | | |
|---|---|---|
| JP | 2010-033732 A | 2/2010 |
| JP | 2011-044249 A | 3/2011 |
| JP | 2012-043646 A | 3/2012 |
| JP | 2016-024874 A | 2/2016 |
| JP | 2016-207421 A | 12/2016 |
| JP | 2019-036536 A | 3/2019 |
| JP | 2019-186129 A | 10/2019 |
| WO | 2017-094712 A1 | 6/2017 |
| WO | 2018-164224 A1 | 9/2018 |
| WO | 2019-09228 A1 | 1/2019 |
| WO | 2019-031436 A1 | 2/2019 |
| WO | 2019-131725 A1 | 7/2019 |

OTHER PUBLICATIONS

Korean Office Action issued for the corresponding Korean Application No. 10-2021-7020171; dated Dec. 6, 2021 (total 13 pages).
Chinese Office Action issued for the corresponding Chinese Application No. 202080008256.0 dated Oct. 21, 2021 (total 14 pages).
International Preliminary Report on Patentability in English issued in PCT/JP2020/048632; dated Jun. 28, 2022 (total 5 pages).

* cited by examiner

< (1-1) Intermediate Provision Step>

Raw Material Powder
(First Raw Material Powder)

Thermal Treatment

Thermally-Treated Product

Pulverization

Pulverized Product
(Intermediate)

SULFIDE SOLID ELECTROLYTE AND METHOD OF PRODUCING THE SAME

CROSS REFERENCE TO RELATED APPLICATIONS

This application is a U.S. National Phase application under 35 U.S.C. 371 of International Application No. PCT/JP2020/048632, filed on Dec. 25, 2020, which claims priority to Japanese Patent Application No. 2019-239129, filed on Dec. 27, 2019. The entire disclosures of the above applications are expressly incorporated by reference herein.

BACKGROUND OF THE INVENTION

Field of the Invention

The present invention relates to: a sulfide solid electrolyte; an electrode composite material, a slurry and a battery, in each of which the sulfide solid electrolyte is used; and a method of producing the sulfide solid electrolyte.

Related Art

A solid-state battery is characterized by being superior in production cost and productivity since a flammable organic solvent is not used and thus a safety device can be simplified, and by achieving high voltage when being stacked in series in a cell. In addition, it is expected that safety and durability can be improved since, in a sulfide solid electrolyte used for a solid-state battery, only lithium ions move and thus a side reaction due to movements of anions does not occur.

As a sulfide solid electrolyte, a sulfide solid electrolyte containing an argyrodite-type crystal phase has been known (for example, JP 2001-250580 A, JP 2016-024874 A, JP 2010-033732 A, JP 2011-044249 A and JP 2012-043646 A).

Furthermore, JP 2019-036536 A discloses a method of producing a sulfide solid electrolyte having a median diameter $D_{50}$ of 2.1 µm to 4.5 µm.

SUMMARY OF THE INVENTION

In a solid-state battery, in order to obtain a good battery characteristic, it is preferable to uniformly distribute a sulfide solid electrolyte inside positive and negative electrodes. In order to realize the uniform distribution of the sulfide solid electrolyte, it is preferable to reduce the particle size of the sulfide solid electrolyte. The particle size of the sulfide solid electrolyte can be reduced by pulverizing the sulfide solid electrolyte. However, the pulverization results in particles distorted in shape and secondary particles formed by aggregation of fine particles generated during the pulverization, and thus results in an increase in the specific surface area of the sulfide solid electrolyte and an increase in the amount of solvent adsorbed on the particle surfaces of the sulfide solid electrolyte. Therefore, a slurry containing the sulfide solid electrolyte has an increased viscosity. Consequently, a large amount of solvent is required in order to adjust the viscosity of the slurry, and thus the cost increases and the battery productivity decreases. Accordingly, there is a need to reduce both of the particle size and the specific surface area of the sulfide solid electrolyte.

When the sulfide solid electrolyte reacts with atmospheric moisture, toxic hydrogen sulfide gas generates and the ionic conductivity decreases because of decomposition. Consequently, the cost increases in order to maintain a low moisture environment during the production of the battery, and the productivity of the battery decreases. If the sulfide solid electrolyte has a small particle size and a low specific surface area, this will make it possible to reduce the area of the surface where the reaction between the sulfide solid electrolyte and atmospheric moisture occurs and thus suppress the generation of hydrogen sulfide gas and the decrease in the ionic conductivity due to the decomposition. Accordingly, from these viewpoints as well, there is a need to reduce both of the particle size and the specific surface area of the sulfide solid electrolyte.

An object of the present invention is to provide a sulfide solid electrolyte having a small particle size and a low specific surface area; an electrode composite material, a slurry and a battery, in each of which the sulfide solid electrolyte is used;

and a method of producing the sulfide solid electrolyte.

In order to solve the above problems, the present invention provides the following inventions.

[1] A sulfide solid electrolyte, containing lithium (Li), phosphorus (P) and sulfur (S) elements,
wherein the sulfide solid electrolyte has:
a median diameter $D_{50}$, which is a particle size at a cumulative volume of 50 vol % in a volume-based particle size distribution measured by a laser diffraction scattering particle size distribution measurement method, of 0.10 µm or more and 2.0 µm or less; and
a value of the formula: $(A \times B)/C$, wherein A represents a BET specific surface area ($m^2/g$), B represents a true density ($g/cm^3$), and C represents a CS value ($m^2/cm^3$), of 1.0 or more and 2.5 or less.

[2] An electrode composite material, containing the sulfide solid electrolyte according to [1] described above and an active material.

[3] A slurry, containing the sulfide solid electrolyte according to [1] described above and a dispersion medium.

[4] A battery, including a positive electrode layer, a negative electrode layer and a solid electrolyte layer located between the positive electrode layer and the negative electrode layer,
wherein the solid electrolyte layer contains the sulfide solid electrolyte according to [1] described above.

[5] A method of producing the sulfide solid electrolyte according to [1] described above, the method including the steps of:
(1-1) providing as an intermediate a sulfide solid electrolyte that contains lithium (Li), phosphorus (P) and sulfur (S) elements and has a median diameter $D_{50}$ of 0.10 µm or more and 2.0 µm or less and a value of the formula: $(A \times B)/C$, wherein A represents a BET specific surface area ($m^2/g$), B represents a true density ($g/cm^3$), and C represents a CS value ($m^2/cm^3$), of more than 2.5 and 5.0 or less, and
(1-2) subjecting the intermediate to thermal treatment and pulverizing the resulting thermally-treated product to obtain a pulverized product that has a median diameter $D_{50}$ of 0.10 µm or more and 2.0 µm or less.

[6] A method of producing the sulfide solid electrolyte according to [1] described above, the method including the steps of:
(2-1) providing a raw material powder that contains lithium (Li), phosphorus (P) and sulfur (S) elements and has a median diameter $D_{50}$ of 0.10 µm or more and 2.0 µm or less and a $D_{95}$ of 0.30 µm or more and 5.0 µm or less; and
(2-2) subjecting the raw material powder to thermal treatment and pulverizing the resulting thermally-treated product to obtain a pulverized product that has a median diameter $D_{50}$ of 0.10 µm or more and 2.0 µm or less.

The present invention provides a sulfide solid electrolyte having a small particle size and a low specific surface area;

an electrode composite material, a slurry and a battery, in each of which the sulfide solid electrolyte is used; and a method of producing the sulfide solid electrolyte.

DETAILED DESCRIPTION OF THE INVENTION

Descriptions of Terms

The terms used in the present specification are described below. The following descriptions of the terms are applied throughout the present specification unless otherwise specified.

<Powder>

A powder means a plurality of particles.

<$D_{10}$, $D_{50}$ and $D_{95}$>

Regarding a powder, the $D_{10}$, $D_{50}$ and $D_{95}$ of the powder mean particle sizes at cumulative volumes of 10%, 50% and 95%, respectively, in a volume-based particle size distribution of the powder measured by a laser diffraction scattering particle size distribution measurement method. The unit is μm. The $D_{10}$, $D_{50}$ and $D_{95}$ are measured, for example, according to the conditions described in Examples. The $D_{50}$ is generally referred to as a median diameter.

<BET Specific Surface Area>

Regarding a powder, the BET specific surface area of the powder means a specific surface area of the powder measured by a gas adsorption method using nitrogen gas. The unit is $m^2/g$. The BET specific surface area is measured, for example, according to the conditions described in Examples.

<True Density>

Regarding a powder, the true density of the powder means a density of the powder as measured by pycnometry. The unit is $g/cm^3$. The true density is measured, for example, according to the conditions described in Examples.

<CS Value>

Regarding a powder, the CS value of the powder means a surface area per unit volume of the powder calculated on the assumption that each of the particles constituting the powder has a spherical shape. The unit is $m^2/cm^3$. The CS value of the powder is calculated from the following formula: CS value ($m^2/cm^3$)=6/MA, based on a volume-based particle size distribution of the powder measured by a laser diffraction scattering particle size distribution measurement method. In the above formula, MA represents an area average particle size (μm), and is obtained from the formula: MA (μm)=ΣVi/Σ(Vi/di), wherein Vi represents a frequency and di represents a median value in a particle size class. The CS value is measured, for example, according to the conditions described in Examples.

<(A×B)/C>

Regarding a powder, the value calculated from the following formula: (A×B)/C, wherein A represents the BET specific surface area ($m^2/g$) of the powder, B represents the true density ($g/cm^3$) of the powder, and C represents the CS value ($m^2/cm^3$) of the powder, means the ratio of the specific surface area ($m^2/g$) obtained by the BET measurement to the surface area value ($m^2/g$) obtained by dividing the CS value ($m^2/cm^3$) calculated from the particle size distribution measurement on the assumption that the particles are spherical in shape, by the true density ($g/cm^3$). That is, if the value calculated from the above formula is closer to 1.0, this will means that each of the particles constituting the powder has a shape closer to a spherical shape.

<<Sulfide Solid Electrolyte>>

The sulfide solid electrolyte of the present invention contains lithium (Li), phosphorus (P) and sulfur (S) elements.

The contents of the lithium (Li), phosphorus (P) and sulfur (S) elements in the sulfide solid electrolyte of the present invention can be appropriately adjusted.

From the viewpoint of improving the lithium ion conductivity of the sulfide solid electrolyte of the present invention, the content of the lithium (Li) element is preferably 41 mol % or more and 50 mol % or less, more preferably 41 mol % or more and 48 mol % or less, still more preferably 42 mol % or more and 47 mol % or less, and still more preferably 43 mol % or more and 45 mol % or less, based on the total molar amount of the constituent elements of the sulfide solid electrolyte.

From the viewpoint of improving the lithium ion conductivity of the sulfide solid electrolyte of the present invention, the content of the phosphorus (P) element is preferably 7.0 mol % or more and 20 mol % or less, more preferably 7.2 mol % or more and 18 mol % or less, still more preferably 7.5 mol % or more and 16 mol % or less, and still more preferably 7.7 mol % or more and 12 mol % or less, based on the total molar amount of the constituent elements of the sulfide solid electrolyte.

From the viewpoint of improving the lithium ion conductivity of the sulfide solid electrolyte of the present invention, the content of the sulfur (S) element is preferably 31 mol % or more and 43 mol % or less, more preferably 32 mol % or more and 42 mol % or less, still more preferably 33 mol % or more and 40 mol % or less, and still more preferably 34 mol % or more and 38 mol % or less, based on the total molar amount of the constituent elements of the sulfide solid electrolyte.

From the viewpoint of improving the lithium ion conductivity of the sulfide solid electrolyte of the present invention, the content ratio of the lithium (Li) element to the phosphorus (P) element (the content of the lithium (Li) element/the content of the phosphorus (P) element) is, in a molar ratio, preferably 4.8 or more and 7.0 or less, more preferably 5.0 or more and 6.4 or less, and still more preferably 5.2 or more and 5.8 or less.

From the viewpoint of improving the lithium ion conductivity of the sulfide solid electrolyte of the present invention, the content ratio of the sulfur (S) element to the phosphorus (P) element (the content of the sulfur (S) element/the content of the phosphorus (P) element) is, in a molar ratio, preferably 3.6 or more and 6.0 or less, more preferably 4.0 or more and 5.0 or less, and still more preferably 4.2 or more and 4.6 or less.

From the viewpoint of improving the lithium ion conductivity of the sulfide solid electrolyte of the present invention, it is preferable that the sulfide solid electrolyte further contains at least one halogen (X) element selected from fluorine (F), chlorine (Cl), bromine (Br) and iodine (I) elements, and it is more preferable that the sulfide solid electrolyte further contains at least one halogen (X) element selected from chlorine (Cl) and bromine (Br) elements.

The content of the halogen (X) element(s) can be adjusted appropriately.

From the viewpoint of improving the lithium ion conductivity of the sulfide solid electrolyte of the present invention, the content of the halogen (X) element(s) is preferably 3.7 mol % or more and 19 mol % or less, more preferably 4.0 mol % or more and 17 mol % or less, still more preferably 8.0 mol % or more and 15 mol % or less, and still more preferably 10 mol % or more and 14 mol % or less, based on the total molar amount of the constituent elements of the sulfide solid electrolyte. When the sulfide solid electrolyte of the present invention contains two or more halogen (X) elements, the "content of the halogen (X) element(s)" means the total content of the two or more halogen (X) elements.

From the viewpoint of improving the lithium ion conductivity of the sulfide solid electrolyte of the present invention, the content ratio of the halogen (X) element(s) to the phosphorus (P) element (the content of the halogen (X) element(s)/the content of the phosphorus (P) element) is, in a molar ratio, preferably 0.50 or more and 2.1 or less, more preferably 0.80 or more and 2.0 or less, and still more preferably 1.2 or more and 1.8 or less.

The sulfide solid electrolyte of the present invention may contain one or two or more elements other than the lithium (Li), phosphorus (P), sulfur (S) and halogen (X) elements (hereinafter referred to as "other element(s)"). Examples of the other element(s) include silicon (Si), germanium (Ge), tin (Sn), lead (Pb), boron (B), aluminum (Al), gallium (Ga), arsenic (As), antimony (Sb) and bismuth (Bi) elements and the like.

The total molar amount of the constituent elements of the sulfide solid electrolyte and the molar amount of each of the constituent elements can be determined by using a known method such as inductively coupled plasma atomic emission spectroscopy (ICP-AES) or the like to measure the contents of the elements in a solution obtained by dissolving the sulfide solid electrolyte by alkali fusion or the like.

From the viewpoint of improving the lithium ion conductivity of the sulfide solid electrolyte of the present invention, it is preferable that the sulfide solid electrolyte of the present invention contains a crystal phase having an argyrodite-type crystal structure (hereinafter, sometimes referred to as an "argyrodite-type crystal phase"). The argyrodite-type crystal structure is a crystal structure possessed by a group of compounds derived from a mineral represented by the chemical formula: $Ag_8GeS_6$. The argyrodite-type crystal structure preferably belongs to a cubic crystal system.

The expression that "the sulfide solid electrolyte contains an argyrodite-type crystal phase" includes the following both cases: the case in which the sulfide solid electrolyte is composed of an argyrodite-type crystal phase, and the case in which the sulfide solid electrolyte is composed of an argyrodite-type crystal phase and one or two or more other phases. The other phase(s) may be a crystal phase or an amorphous phase. Examples of the other phase(s) include $Li_2S$, $LiCl$, $LiBr$, $LiBr_xCl_{1-x}$ (0<x<1) and $Li_3PS_4$ phases and the like.

The content ratio of the argyrodite-type crystal phase to all the crystal phases contained in the sulfide solid electrolyte of the present invention may be, for example, 10 mass % or more, 20 mass % or more, or 50 mass % or more. In particular, the sulfide solid electrolyte of the present invention preferably contains an argyrodite-type crystal phase as a main phase. The "main phase" herein means a phase having the largest content ratio with respect to the total content of all the crystal phases contained in the sulfide solid electrolyte of the present invention. When an argyrodite-type crystal phase is contained as a main phase, the content ratio of the argyrodite-type crystal phase to all the crystal phases contained in the sulfide solid electrolyte of the present invention is preferably, for example, 60 mass % or more, and more preferably 70 mass % or more, 80 mass % or more, or 90 mass % or more in particular. The ratio of the crystal phases can be confirmed by, for example, XRD measurement.

In one embodiment, an argyrodite-type crystal phase has a composition represented by the following formula (I).

$$Li_aPS_bX_c \quad (I)$$

X is at least one halogen element selected from fluorine (F), chlorine (Cl), bromine (Br) and iodine (I) elements. An iodine (I) element tends to reduce the lithium ion conductivity, and a fluorine (F) element is difficult to be introduced in the argyrodite-type crystal structure. Therefore, X is preferably at least one halogen element selected from chlorine (Cl) and bromine (Br) elements.

From the viewpoint of improving the lithium ion conductivity of the sulfide solid electrolyte of the present invention, a is preferably 3.0 or more and 6.5 or less, more preferably 3.5 or more and 6.3 or less, and still more preferably 4.0 or more and 6.0 or less. When a is less than 3.0, the Li content in the argyrodite-type crystal structure is small, and thus the lithium ion conductivity decreases. On the other hand, when a exceeds 6.5, the number of pores of the Li sites is small, and thus the lithium ion conductivity decreases.

From the viewpoint of improving the lithium ion conductivity of the sulfide solid electrolyte of the present invention, b is preferably 3.5 or more and 5.5 or less, more preferably 4.0 or more and 5.3 or less, and still more preferably 4.2 or more and 5.0 or less.

From the viewpoint of improving the lithium ion conductivity of the sulfide solid electrolyte of the present invention, c is preferably 0.10 or more and 3.0 or less, more preferably 0.50 or more and 2.5 or less, and still more preferably 1.0 or more and 1.8 or less.

In another embodiment, an argyrodite-type crystal phase has a composition represented by the following formula (II).

$$Li_{7-d}PS_{6-d}X_d \quad (II)$$

The composition represented by formula (II) is the stoichiometric composition of the argyrodite-type crystal phase.

In formula (II), X has the same meaning as in formula (I)

From the viewpoint of improving the lithium ion conductivity of the sulfide solid electrolyte of the present invention, d is preferably 0.40 or more and 2.2 or less, more preferably 0.80 or more and 2.0 or less, and still more preferably 1.2 or more and 1.8 or less.

In formula (I) or (II), P may be partially substituted with one or two or more elements selected from silicon (Si), germanium (Ge), tin (Sn), lead (Pb), boron (B), aluminum (Al), gallium (Ga), arsenic (As), antimony (Sb) and bismuth (Bi) elements. In this case, formula (I) is changed to $Li_a(P_{1-y}M_y)S_bX_c$, and formula (II) is changed to $Li_{7-d}(P_{1-y}M_y)S_{6-d}X_d$. M is one or two or more elements selected from silicon (Si), germanium (Ge), tin (Sn), lead (Pb), boron (B), aluminum (Al), gallium (Ga), arsenic (As), antimony (Sb) and bismuth (Bi) elements. Preferably, y is 0.010 or more and 0.70 or less, more preferably 0.020 or more and 0.40 or less, and still more preferably 0.050 or more and 0.20 or less.

The fact that the sulfide solid electrolyte of the present invention contains an argyrodite-type crystal phase can be confirmed by an X-ray diffraction pattern measured with CuKα radiation. For example, CuKα1 radiation can be used as the CuKα radiation.

In the X-ray diffraction pattern of the sulfide solid electrolyte of the present invention measured with CuKα1 radiation, it is preferable that peaks are present at positions of 2θ=25.19°±1.00° and 2θ=29.62°±1.00°. These peaks are derived from the argyrodite-type crystal phase.

In the X-ray diffraction pattern of the sulfide solid electrolyte of the present invention measured with CuKα1 radiation, it is more preferable that a peak(s) is/are present at one or two or more positions selected from 2θ=15.34°±1.00°, 17.74°±1.00°, 30.97°±1.00°, 44.37°±1.00°, 47.22°±1.00° and 51.70°±1.00° in addition to positions of 2θ=25.19°±1.00° and 29.62°±1.00°, and it is further more preferable that peaks are present at all the positions of 2θ=15.34°±1.00°, 17.74°±1.00°, 30.97°±1.00°, 44.37°±1.00°, 47.22°±1.00° and 51.70°±1.00° in addition to positions of 2θ=25.19°±1.00° and 29.62°±1.00°. These peaks are derived from the argyrodite-type crystal phase.

Each of the positions of the peaks described above is represented by a median value±1.00°, but preferably by a median value±0.500°, and more preferably by a median value±0.300°.

The sulfide solid electrolyte of the present invention is in the form of powder. The $D_{50}$ of the sulfide solid electrolyte of the present invention is 0.10 μm or more and 2.0 μm or less, and the value of (A×B)/C of the sulfide solid electrolyte of the present invention is 1.0 or more and 2.5 or less. When the value of (A×B)/C is 1.0 or more and 2.5 or less, each of the particles constituting the powder has a shape close to a spherical shape. The sulfide solid electrolyte of the present invention has a small particle size and a low specific surface area, which is caused by the fact that the sulfide solid electrolyte has a shape close to a spherical shape. Therefore, when a battery is produced by using a slurry that contains the sulfide solid electrolyte of the present invention, it is possible to reduce the amount of solvent required for adjusting the viscosity of the slurry. In addition, it is possible to suppress the generation of hydrogen sulfide gas and the decrease in the ionic conductivity, which are caused by the reaction between the sulfide solid electrolyte and atmospheric moisture.

In a solid-state battery, in order to obtain a good battery characteristic, it is preferable to uniformly distribute a sulfide solid electrolyte inside positive and negative electrodes. In order to realize the uniform distribution of the sulfide solid electrolyte, it is preferable to reduce the particle size of the sulfide solid electrolyte. From the above viewpoint, the $D_{50}$ of the sulfide solid electrolyte of the present invention is preferably 0.20 μm or more and 1.6 μm or less, more preferably 0.30 μm or more and 1.2 μm or less, and still more preferably 0.50 μm or more and 1.0 μm or less.

Pulverization of a sulfide solid electrolyte can reduce the particle size of the sulfide solid electrolyte. However, the pulverization results in particles distorted in shape and secondary particles formed by aggregation of fine particles generated during the pulverization, and thus results in an increase in the specific surface area of the sulfide solid electrolyte and an increase in the amount of solvent adsorbed on the particle surfaces of the sulfide solid electrolyte. Therefore, a slurry containing the sulfide solid electrolyte has an increased viscosity. Consequently, a large amount of solvent is required in order to adjust the viscosity of the slurry, and thus the cost increases and the battery productivity decreases. In addition, when the sulfide solid electrolyte reacts with atmospheric moisture, toxic hydrogen sulfide gas generates and the ionic conductivity decreases because of decomposition. As the specific surface area of the sulfide solid electrolyte increases, the area of the surface where the reaction between the sulfide solid electrolyte and atmospheric moisture occurs increases, and thus the generation of hydrogen sulfide gas and the decrease in the ionic conductivity are enhanced. Consequently, the cost increases in order to maintain a low moisture environment during the production of the battery, and the battery productivity decreases. Accordingly, it is preferable that the sulfide solid electrolyte has a shape close to a spherical shape. From the above viewpoint, the value of (A×B)/C of the sulfide solid electrolyte of the present invention is preferably 1.2 or more and 2.3 or less, more preferably 1.4 or more and 2.2 or less, and still more preferably 1.5 or more and 2.1 or less.

In addition to the above characteristics (the $D_{50}$ and the value of (A×B)/C), it is preferable that the sulfide solid electrolyte of the present invention has at least one of the following characteristics (the $D_{10}$, the $D_{95}$, the BET specific surface area, the true density and the CS value).

The $D_{10}$ of the sulfide solid electrolyte of the present invention is not particularly limited, but is preferably 0.10 μm or more and 1.0 μm or less, more preferably 0.20 μm or more and 0.80 μm or less, and still more preferably 0.30 μm or more and 0.60 μm or less, from the viewpoint of uniformly distributing the sulfide solid electrolyte inside positive and negative electrodes and thus obtaining a good battery characteristic.

The $D_{95}$ of the sulfide solid electrolyte of the present invention is not particularly limited, but is preferably 0.70 μm or more and 3.0 μm or less, more preferably 0.90 μm or more and 2.3 μm or less, and still more preferably 1.2 μm or more and 1.8 μm or less, from the viewpoint of uniformly distributing the sulfide solid electrolyte inside positive and negative electrodes and thus obtaining a good battery characteristic.

The BET specific surface area of the sulfide solid electrolyte of the present invention is not particularly limited, but is preferably 2.0 $m^2/g$ or more and 20 $m^2/g$ or less, more preferably 4.0 $m^2/g$ or more and 15 $m^2/g$ or less, and still more preferably 5.0 $m^2/g$ or more and 12 $m^2/g$ or less, from the viewpoint of, when a battery is produced by using a slurry containing the sulfide solid electrolyte, reducing further the amount of solvent required for adjusting the viscosity of the slurry and reducing further the generation of hydrogen sulfide gas and the decrease in the ionic conductivity, which are caused by the reaction between the sulfide solid electrolyte and atmospheric moisture.

The true density of the sulfide solid electrolyte of the present invention is not particularly limited, but is preferably 0.50 $g/cm^3$ or more and 4.0 $g/cm^3$ or less, more preferably 0.60 $g/cm^3$ or more and 3.5 $g/cm^3$ or less, and still more preferably 0.70 $g/cm^3$ or more and 3.0 $g/cm^3$ or less, from the viewpoint of, when a battery is produced by using a slurry containing the sulfide solid electrolyte, reducing further the amount of solvent required for adjusting the viscosity of the slurry and reducing further the generation of hydrogen sulfide gas and the decrease in the ionic conductivity, which are caused by the reaction between the sulfide solid electrolyte and atmospheric moisture.

The CS value of the sulfide solid electrolyte of the present invention is not particularly limited, but is preferably 1.0 $m^2/cm^3$ or more and 20 $m^2/cm^3$ or less, more preferably 2.0 $m^2/cm^3$ or more and 15 $m^2/cm^3$ or less, and still more preferably 3.0 $m^2/cm^3$ or more and 12 $m^2/cm^3$ or less, from the viewpoint of, when a battery is produced by using a slurry containing the sulfide solid electrolyte, reducing further the amount of solvent required for adjusting the viscosity of the slurry and reducing further the generation of hydrogen sulfide gas and the decrease in the ionic conductivity, which are caused by the reaction between the sulfide solid electrolyte and atmospheric moisture invention.

<<Electrode Composite Material>>

The electrode composite material of the present invention contains the sulfide solid electrolyte of the present invention and an active material.

In one embodiment, the electrode composite material of the present invention may be a negative-electrode composite material or a positive-electrode composite material. The negative-electrode composite material contains at least a negative-electrode active material, and the positive-electrode composite material contains at least a positive-electrode active material. The electrode composite material may contain a solid electrolyte, a conductive auxiliary agent and a binder, if necessary.

Examples of the negative-electrode active material include carbon materials, metal materials and the like, and one of these can be used alone or two or more of these can be used in combination. As the carbon materials and the metal materials, materials generally known as a negative-electrode active material can be appropriately used, and thus the descriptions thereof are omitted here. The negative-electrode active material preferably has electron conductivity.

The positive-electrode active material is a substance capable of inserting and removing lithium ions, and can be appropriately selected from known positive-electrode active materials. Examples of the positive-electrode active material include metal oxides and sulfides. Examples of the metal oxides include transition metal oxides and the like.

The other descriptions concerning the electrode composite material can be the same as those of a general electrode composite material, and thus the descriptions thereof are omitted here.

<<Slurry>>

The slurry of the present invention contains the sulfide solid electrolyte of the present invention and a dispersion medium.

The content of the sulfide solid electrolyte of the present invention in the slurry of the present invention can be appropriately adjusted according to the purpose or the like of the slurry of the present invention. The slurry of the present invention can have various viscosities depending on the content of the sulfide solid electrolyte of the present invention, and can take various forms such as ink and paste depending on the viscosity. The content of the sulfide solid electrolyte of the present invention in the slurry of the present invention is preferably 10 mass % or more and 90 mass % or less, more preferably 20 mass % or more and 80 mass % or less, still more preferably 30 mass % or more and 70 mass % or less, based on the total mass of the slurry of the present invention.

The dispersion medium contained in the slurry of the present invention is not particularly limited as long as the dispersion medium is a liquid capable of dispersing the sulfide solid electrolyte of the present invention. Examples of the dispersion medium include water, organic solvents and the like. The dispersion medium may be one kind of solvent or a mixture of two or more kinds of solvents.

<<Battery>>

The battery of the present invention is a battery including a positive electrode layer, a negative electrode layer and a solid electrolyte layer located between the positive electrode layer and the negative electrode layer, and the solid electrolyte layer contains the sulfide solid electrolyte of the present invention. The positive electrode layer, the negative electrode layer and the solid electrolyte layer can be the same as those of a general battery, and thus the descriptions thereof are omitted here.

The battery of the present invention is preferably a solid-state battery, more preferably a lithium solid-state battery. The lithium solid-state battery may be a primary battery or a secondary battery, but is preferably a lithium secondary battery. The solid-state battery includes not only an aspect of a solid-state battery containing no liquid substance or gel-like substance as an electrolyte, but also an aspect of a solid-state battery containing, for example, 50 mass % or less, 30 mass % or less, 10 mass % or less of a liquid substance or gel-like substance as an electrolyte. Examples of the form of the solid-state battery include a laminated type, a cylindrical type, a square type and the like.

<<Production Method of Sulfide Solid Electrolyte>>

The embodiments of the method of producing the sulfide solid electrolyte of the present invention are described below.

First Embodiment

Figure 1:
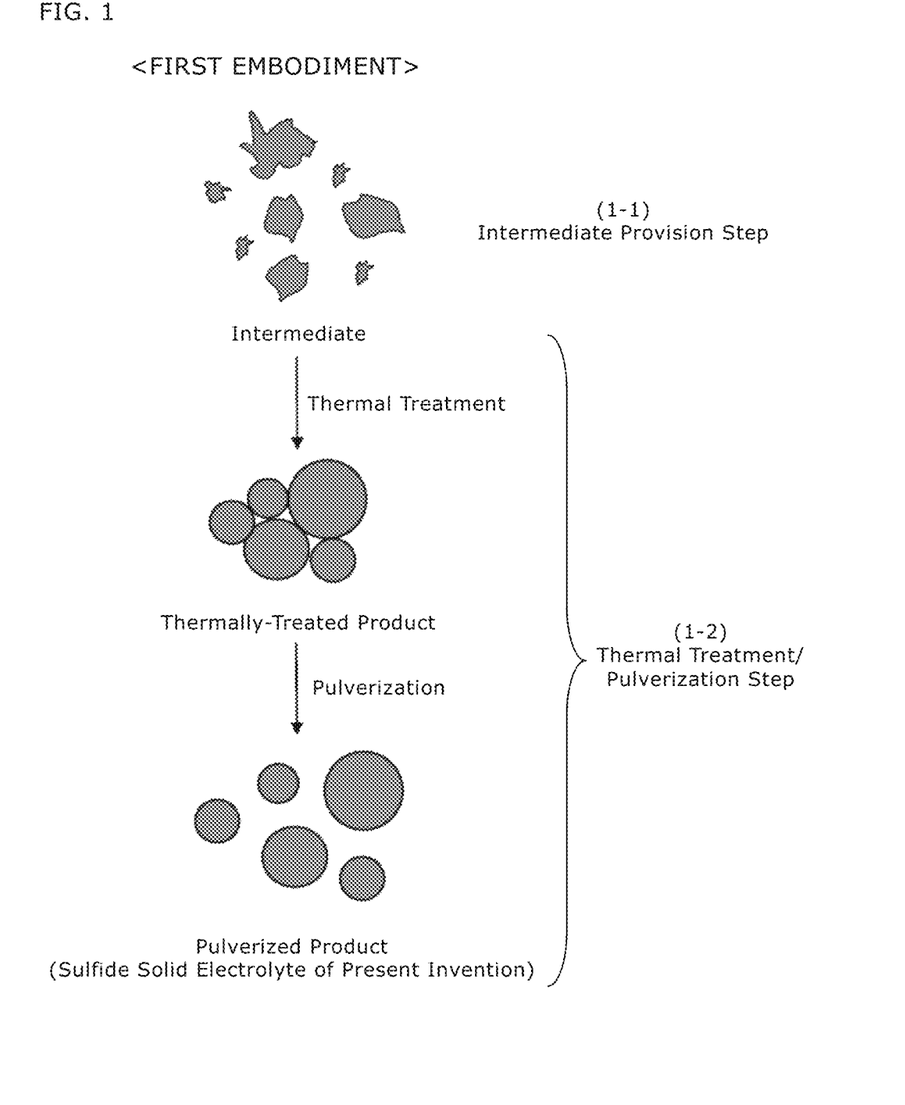
FIG. 1 is a process diagram showing an example of the method of producing the sulfide solid electrolyte of the present invention (the first embodiment).

The production method according to the first embodiment includes, as shown in FIG. 1 for example, the following steps of:

(1-1) providing as an intermediate a sulfide solid electrolyte that contains lithium (Li), phosphorus (P) and sulfur (S) elements and has a $D_{50}$ of 0.10 μm or more and 2.0 μm or less and a value of (A×B)/C of more than 2.5 and 5.0 or less; and (1-2) subjecting the intermediate provided in step (1-1) to thermal treatment and pulverizing the resulting thermally-treated product to obtain a pulverized product having a $D_{50}$ of 0.10 μm or more and 2.0 μm or less.

The intermediate provided in step (1-1) is a precursor of the sulfide solid electrolyte of the present invention, and the sulfide solid electrolyte of the present invention can be obtained by subjecting the intermediate to step (1-2).

The reasons why a sulfide solid electrolyte having a small particle size and a reduced specific surface area can be obtained in the production method according to the first embodiment are as follows. The intermediate, which is a sulfide solid electrolyte containing lithium (Li), phosphorus (P) and sulfur (S) elements and having a median diameter $D_{50}$ of 0.10 μm or more and 2.0 μm or less and a value of (A×B)/C of more than 2.5 and 5.0 or less, contains a large amount of particles distorted in shape and fine particles and thus has a large specific surface area. If the intermediate is subjected to thermal treatment, the fine particles will be partially sintered, and thus a structure having necking of particles approximately spherical in shape will be obtained as a thermally-treated product. If the thermally-treated product is pulverized to obtain a pulverized product having a $D_{50}$ of 0.10 μm or more and 2.0 μm or less, the surface of the necking will be preferentially pulverized, and thus this will make it possible to suppress generation of particles distorted in shape and fine particles and obtain a sulfide solid electrolyte having a small particle size and a reduced specific surface area.

The sulfide solid electrolyte constituting the intermediate is in the form of powder like the sulfide solid electrolyte of the present invention. The composition of the intermediate can be appropriately adjusted in consideration of the composition of the sulfide solid electrolyte of the present invention. The composition of the intermediate is usually the same as the composition of the sulfide solid electrolyte of the present invention. It is preferable that the intermediate contains an argyrodite-type crystal phase. The composition of the argyrodite-type crystal phase contained in the intermediate can be appropriately adjusted in consideration of the composition of the argyrodite-type crystal phase contained in the sulfide solid electrolyte of the present invention. The descriptions of the argyrodite-type crystal phase contained in the intermediate are the same as the above descriptions of the argyrodite-type crystal phase contained in the sulfide solid electrolyte of the present invention, and thus the descriptions thereof are omitted here.

The $D_{50}$ of the intermediate in step (1-2) may be, for example, 0.20 μm or more and 1.8 μm or less, 0.30 μm or more and 1.4 μm or less, and 0.40 μm or more and 1.0 μm or less.

In step (1-2), the $D_{50}$ ratio of the pulverized product to the intermediate is preferably 0.10 or more and 10 or less, more preferably 0.50 or more and 3.0 or less, and still more preferably 0.80 or more and 1.5 or less. When the above ratio has the predetermined lower limit, it is possible to make the shape of the pulverized product closer to a spherical shape. Furthermore, when the above ratio has the predetermined upper limit, it is possible to suppress the generation of fine particles during the pulverization step.

The value of (A×B)/C of the intermediate in step (1-2) may be, for example, 2.6 or more and 5.0 or less, 2.7 or more and 4.5 or less, and 2.8 or more and 4.0 or less.

The $D_{10}$ of the intermediate is not particularly limited, but is preferably 0.10 μm or more and 1.0 μm or less, more preferably 0.20 μm or more and 0.80 μm or less, and still more preferably 0.30 μm or more and 0.60 μm or less, from the viewpoint of efficiently obtaining a pulverized product having a desired $D_{10}$ in step (1-2).

The $D_{95}$ of the intermediate is not particularly limited, but is preferably 0.50 μm or more and 5.0 μm or less, more preferably 0.60 μm or more and 4.5 μm or less, and still more preferably 0.70 μm or more and 4.0 μm or less, from the viewpoint of efficiently obtaining a pulverized product having a desired $D_{95}$ in step (1-2).

The BET specific surface area of the intermediate is not particularly limited, but is preferably 3.0 m²/g or more and 25 m²/g or less, more preferably 5.0 m²/g or more and 20 m²/g or less, and still more preferably 7.0 m²/g or more and 17 m²/g or less, from the viewpoint of efficiently obtaining a pulverized product having a desired BET specific surface area in step (1-2).

The true density of the intermediate is not particularly limited, but can be, for example, 1.5 g/cm³ or more and 5.0 g/cm³ or less, 1.7 g/cm³ or more and 4.5 g/cm³ or less, or 1.9 g/cm³ or more and 4.0 g/cm³ or less.

The CS value of the intermediate is not particularly limited, but can be, for example, 1.0 m²/cm³ or more and 25 m²/cm³ or less, 2.0 m²/cm³ or more and 20 m²/cm³ or less, or 3.0 m²/cm³ or more and 15 m²/cm³ or less.

Figure 2:
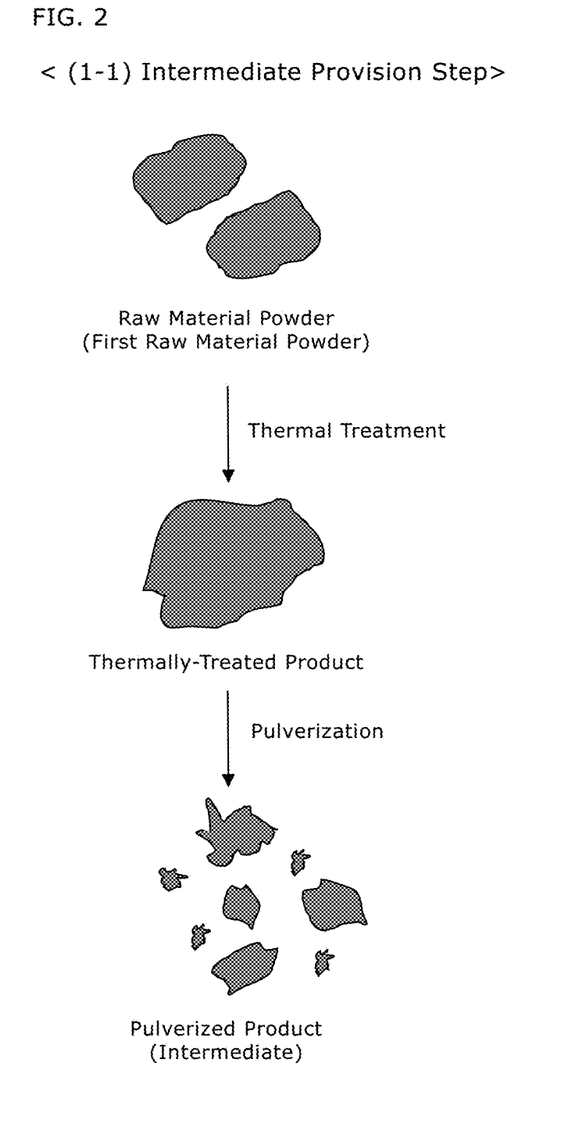
FIG. 2 is a process diagram showing an example of step (1-1) in the first embodiment.

In the present invention, as shown in FIG. 2 for example, the intermediate in step (1-1) is obtained by providing a raw material powder that contains lithium (Li), phosphorus (P) and sulfur (S) elements and has a $D_{50}$ of 0.10 μm or more and 50 μm or less, subjecting the raw material powder to thermal treatment, and pulverizing the resulting thermally-treated product to obtain a pulverized product having a $D_{50}$ of 0.10 μm or more and 2.0 μm or less. Thus, the intermediate having a desired $D_{50}$ and a desired value of (A×B)/C can be efficiently provided. The raw material powder for producing the intermediate is hereinafter referred to as a "first raw material powder."

The first raw material powder is a raw material for the intermediate. The composition of the first raw material powder can be appropriately adjusted in consideration of the composition of the intermediate. The composition of the first raw material powder is usually the same as the composition of the intermediate. The first raw material powder does not contain an argyrodite-type crystal phase. The expression that "the first raw material powder does not contain an argyrodite-type crystal phase" means that the content ratio of the argyrodite-type crystal phase to all the crystal phases contained in the first raw material powder is, for example, 5 mass % or less, 3 mass % or less or 1 mass % or less. The content ratio of the argyrodite-type crystal phase may be 0 mass %. The argyrodite-type crystal phase of the intermediate can be generated by subjecting the first raw material powder to thermal treatment.

For example, a mixture powder that contains a powder of one or more lithium (Li)-containing compounds, a powder of one or more phosphorus (P)-containing compounds, a powder of one or more sulfur (S)-containing compounds and optionally a powder of one or more halogen (X)-containing compounds can be used as the first raw material powder. When a lithium (Li)-containing, phosphorus (P)-containing or halogen (X)-containing compound contains a sulfur (S) element, this compound also corresponds to a sulfur (S)-containing compound.

The lithium (Li)-containing, phosphorus (P)-containing, sulfur (S)-containing and halogen (X)-containing compounds may be the same as known compounds generally used as a raw material for a sulfide solid electrolyte. Thus, the descriptions thereof are omitted.

The first raw material powder can be prepared by mixing a powder of one or more lithium (Li)-containing compounds, a powder of one or more phosphorus (P)-containing compounds, a powder of one or more sulfur (S)-containing compounds and optionally a powder of one or more halogen (X)-containing compounds. The mixing can be performed using, for example, a mortar, a ball mill, a vibration mill, a rolling mill, a bead mill, a kneader or the like. The first raw material powder may contain a reaction product produced by the mixing treatment. The mixing is preferably performed with a force to maintain the crystallinity of the first raw material powder.

The first raw material powder is, for example, a mixture powder containing a $Li_2S$ powder, a $P_2S_5$ powder, a LiCl powder and/or a LiBr powder.

The $D_{50}$ of the first raw material is not particularly limited, and can be, for example, 0.15 μm or more and 40 μm or less, 0.20 μm or more and 30 μm or less, and 0.25 μm or more and 20 μm or less.

When the $D_{50}$ of the first raw material powder is small, the first raw material powder may be directly used as the intermediate. Therefore, when the $D_{50}$ of the first raw material powder is large and thus the first raw material powder cannot be used directly as the intermediate, it is advantageous to perform a step of subjecting the first raw material powder to thermal treatment, pulverizing the resulting thermally-treated product and providing the resulting pulverized product as the intermediate. From this viewpoint, the $D_{50}$ of the first raw material powder is preferably 2.5 μm or more and 40 μm or less, more preferably 3.0 μm or more and 30 μm or less, and still more preferably 4.0 μm or more and 20 μm or less.

The $D_{95}$ of the first raw material powder is not particularly limited, and can be, for example, 0.10 μm or more and 20 μm or less, 0.20 μm or more and 10 μm or less, or 0.30 μm or more and 5.0 μm or less.

In step (1-1), the thermal treatment of the first raw material powder is preferably performed under the conditions that make it possible to produce a sulfide solid electrolyte containing an argyrodite-type crystal phase. The temperature of the thermal treatment is preferably 350° C. or more and 500° C. or less, more preferably 400° C. or more and 480° C. or less, and still more preferably 450° C. or more and 470° C. or less. The duration of the thermal treatment can be appropriately adjusted according to the composition of the first raw material powder, the temperature of the thermal treatment and the like. The duration of the thermal treatment is preferably 1 hour or more and 10 hours or less, more preferably 2 hours or more and 8 hours or less, and still more preferably 3 hours or more and 6 hours or less. The thermal treatment may be performed under an inert gas atmosphere such as a nitrogen or argon atmosphere, but is preferably performed in a hydrogen sulfide gas atmosphere.

In step (1-1), the pulverization of the thermally-treated product (sintered product) obtained by the thermal treatment of the first raw material powder is performed so that a pulverized product having a median diameter $D_{50}$ of 0.10 μm or more and 2.0 μm or less can be obtained. Thus, the intermediate can be obtained. The preferred ranges of $D_{10}$, $D_{50}$ and $D_{95}$ of the pulverized product are the same as the preferred ranges of the $D_{10}$, $D_{50}$ and $D_{95}$ of the intermediate.

The thermally-treated product (sintered product) obtained by the thermal treatment of the first raw material powder can be pulverized by a dry or wet method using, for example, a jet mill, a ball mill, a bead mill or the like. When the pulverization is performed in a wet method, for example, a hydrocarbon solvent can be used as a solvent.

After the pulverization, the pulverized product may be classified using a sieve having a predetermined opening size. The pulverization conditions (for example, the rotation speed of the pulverizer, the process number of the pulverization treatment, the duration of the pulverization treatment, the energy applied to the thermally-treated product and the like), the opening size of the sieve used for classification and the like can be appropriately adjusted depending on the $D_{50}$ of the pulverized product to be obtained.

The thermal treatment of the intermediate provided in step (1-1) is performed at a temperature at which grain growth occurs. Therefore, the $D_{50}$ of the thermally-treated product obtained by the thermal treatment of the intermediate is larger than the $D_{50}$ of the intermediate. For example, the $D_{50}$ of the thermally-treated product may be 1.1 times or more and 200 times or less, 1.3 times or more and 100 times or less, or 2.2 times or more and 60 times or less as large as the $D_{50}$ of the intermediate. Furthermore, for example, the $D_{10}$ of the thermally-treated product may be 1 time or more and 20 times or less, 1.05 times or more and 15 times or less, or 1.1 times or more and 10 times or less as large as the $D_{10}$ of the intermediate. Furthermore, for example, the $D_{95}$ of the thermally-treated product may be 1.2 times or more and 200 times or less, 1.4 times or more and 150 times or less, or 2 times or more and 100 times or less as large as the $D_{95}$ of the intermediate.

In step (1-2), the thermal treatment of the intermediate alleviates the strain inside the solid electrolyte particles contained in the intermediate, and increases the crystallinity. Furthermore, when step (1-1) includes a pulverization step as shown in FIG. 2, fine particles may be generated in the pulverization step. However, the thermal treatment in step (1-2) can promote the sintering of the fine particles. The temperature of the thermal treatment is preferably 200° C. or more and 500° C. or less, more preferably 200° C. or more and 450° C. or less, still more preferably 220° C. or more and 420° C. or less, and still more preferably 240° C. or more and 400° C. or less. The duration of the thermal treatment of the intermediate can be appropriately adjusted according to the composition of the intermediate, the temperature of the thermal treatment and the like. From the viewpoint of efficiently obtaining a pulverized product having a desired $D_{50}$ and a desired value of (A×B)/C in step (1-2), the duration of the thermal treatment is preferably 0.5 hours or more and 5 hours or less, more preferably 2 hours or more and 4 hours or less, and still more preferably 1.5 hours or more and 3 hours or less. The thermal treatment may be performed under a stream of hydrogen sulfide, but is preferably performed in an inert gas atmosphere such as a nitrogen or argon atmosphere in order to obtain a pulverized product having a decreased amount of heterogeneous phases in step (1-2).

The pulverization of the thermally-treated product obtained by the thermal treatment of the intermediate is performed so that a pulverized product having a median diameter $D_{50}$ of 0.10 μm or more and 2.0 μm or less can be obtained. Thus, the sulfide solid electrolyte of the present invention can be obtained. The preferred ranges of $D_{10}$, $D_{50}$ and $D_{95}$ of the resulting pulverized product are the same as the preferred ranges of the $D_{10}$, $D_{50}$ and $D_{95}$ of the sulfide solid electrolyte of the present invention.

In step (1-2), the pulverization of the thermally-treated product (sintered product) obtained by the thermal treatment of the intermediate can be the same as the pulverization of the thermally-treated product (sintered product) obtained by the thermal treatment of the first raw material powder.

From the viewpoint of efficiently obtaining a pulverized product having a desired $D_{50}$ and a desired value of (A×B)/C in step (1-2), for example, the rotation speed of the pulverizer, the process number of the pulverization treatment, the duration of the pulverization treatment, the energy applied to the thermally-treated product and the like in the pulverization of the thermally-treated product (sintered product) obtained by the thermal treatment of the intermediate are preferably smaller than in the pulverization of the thermally-treated product (sintered product) obtained by the thermal treatment of the first raw material powder.

From the viewpoint of efficiently obtaining a pulverized product having a desired $D_{50}$ and a desired value of (A×B)/C in step (1-2), for example, a thermally-treated product (sintered product) obtained by the thermal treatment of the intermediate is preferably pulverized so that the BET specific surface area ratio of the intermediate to the pulverized product of the thermally-treated product obtained by the thermal treatment of the intermediate is 1 or more. The above ratio (the BET specific surface area of the intermediate/the BET specific surface area of the pulverized product) is preferably 1.0 or more and 3.0 or less, more preferably 1.1 or more and 2.2 or less, and still more preferably 1.2 or more and 1.6 or less.

The pulverized product obtained in step (1-2) may be directly used as the sulfide solid electrolyte of the present invention without a further treatment, or may be subjected to a desired treatment and then used as the sulfide solid electrolyte of the present invention.

Second Embodiment

Figure 3:
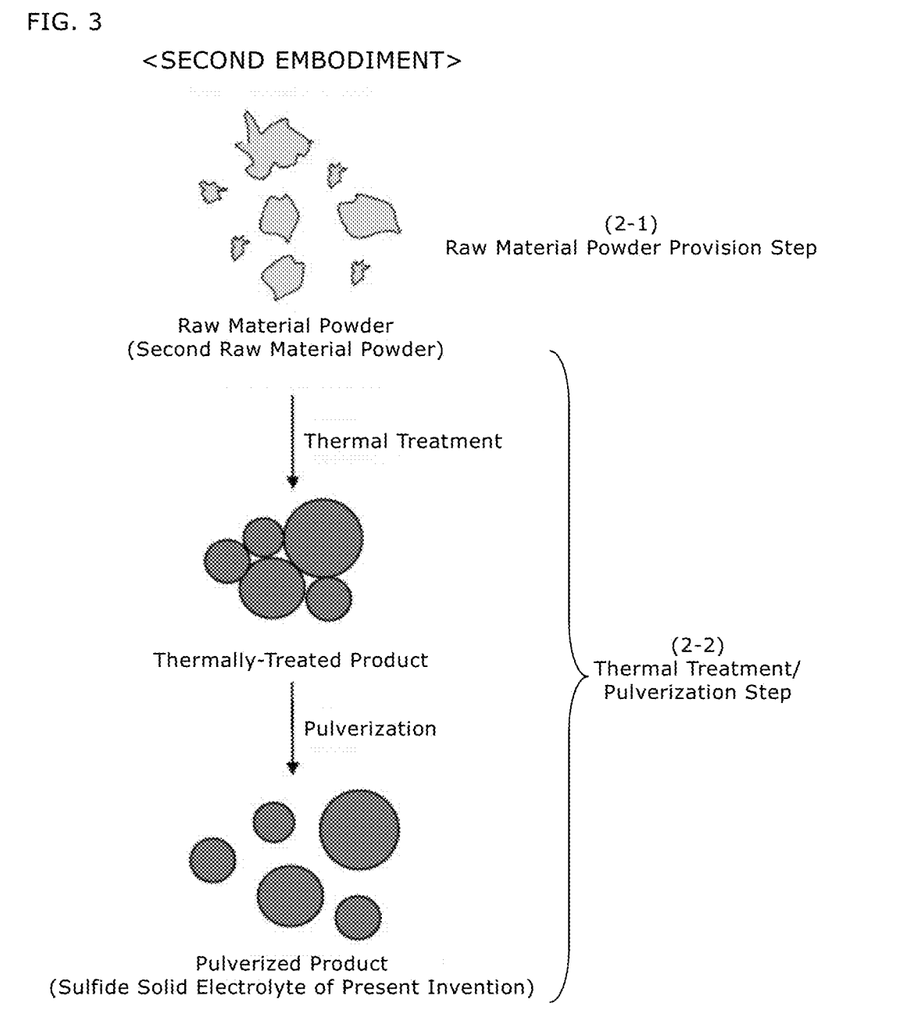
FIG. 3 is a process diagram showing an example of the method of producing the sulfide solid electrolyte of the present invention (the second embodiment).

The production method according to the second embodiment includes, as shown in FIG. 3 for example, the following steps of:
(2-1) providing a raw material powder that contains lithium (Li), phosphorus (P) and sulfur (S) elements and has a $D_{50}$ of 0.10 µm or more and 2.0 µm or less and a $D_{95}$ of 0.30 µm or more and 5.0 µm or less; and (2-2) subjecting the raw material powder to thermal treatment and pulverizing the resulting thermally-treated product to obtain a pulverized product that has a $D_{50}$ of 0.10 µm or more and 2.0 µm or less.

The sulfide solid electrolyte of the present invention can be obtained by subjecting the raw material powder provided in step (2-1) to step (2-2).

The reasons why a sulfide solid electrolyte having a small particle size and a reduced specific surface area can be obtained in the production method according to the second embodiment are as follows. A structure obtained by the thermal treatment of the raw material powder partially reflects the particle size of the raw material powder. If a raw material powder that has a median diameter $D_{50}$ of more than 2.0 µm and a $D_{95}$ of more than 5.0 µm is subjected to thermal treatment, a structure having at least a necking of particles larger than 2.0 µm will tend to be formed. If the structure is pulverized to obtain a pulverized product having a median diameter $D_{50}$ of 0.10 µm or more and 2.0 µm or less, this will result in pulverization of portions other than the surface of the necking, generation of particles distorted in shape and fine particles, and thus an increase in specific surface area. When a raw material powder having a median diameter $D_{50}$ of 0.10 µm or more and 2.0 µm or less and a $D_{95}$ of 0.30 µm or more and 5.0 µm or less is used, the pulverization of portions other than the surface of the necking less frequently occurs. Therefore, it is possible to suppress the generation of particles distorted in shape and fine particles, and thus obtain a sulfide solid electrolyte having a small particle size and a reduced specific surface area.

The raw material powder provided in step (2-1) is the same as the first raw material powder in the first embodiment, except for $D_{10}$, $D_{50}$ and $D_{95}$. The raw material powder provided in step (2-1) is hereinafter referred to as a "second raw material powder."

The second raw material powder does not contain an argyrodite-type crystal phase. The meaning of the expression that "the second raw material powder does not contain an argyrodite-type crystal phase" is the same as in the first raw material powder.

From the viewpoint of efficiently obtaining a pulverized product having a desired $D_{50}$ in step (2-2), the $D_{50}$ of the second raw material powder is preferably 0.15 µm or more and 0.95 µm or less, more preferably 0.20 µm or more and 0.90 µm or less, and still more preferably 0.25 µm or more and 0.85 µm or less.

In step (2-2), the $D_{50}$ ratio of the pulverized product to the second raw material powder is preferably 0.10 or more and 10 or less, more preferably 0.30 or more and 7.0 or less, and still more preferably 0.60 or more and 5.0 or less. It is preferable that the above ratio is the lower limit or more as described above, since this can make the shape of the pulverized product closer to a spherical shape. It is preferable that the above ratio is the upper limit or less as described above, since this can suppress the generation of fine particles during the pulverization step.

The $D_{10}$ of the second raw material powder is not particularly limited, but is preferably 0.10 µm or more and 0.80 µm or less, more preferably 0.12 µm or more and 0.60 µm or less, and still more preferably 0.14 µm or more and 0.40 µm or less, from the viewpoint of efficiently obtaining a pulverized product having a desired $D_{10}$ in step (2-2).

The $D_{95}$ of the second raw material powder is not particularly limited, but is preferably 0.10 µm or more and 5.0 µm or less, more preferably 0.15 µm or more and 3.0 µm or less, and still more preferably 0.20 µm or more and 2.0 µm or less, from the viewpoint of efficiently obtaining a pulverized product having a desired $D_{95}$ in step (2-2).

In step (2-2), the thermal treatment of the second raw material powder is performed under the conditions that make it possible to produce a sulfide solid electrolyte containing an argyrodite-type crystal phase. The temperature of the thermal treatment is preferably 300° C. or more and 550° C. or less, more preferably 320° C. or more and 470° C. or less, still more preferably 350° C. or more and 450° C. or less, and still more preferably 370° C. or more and 430° C. or less. It is preferable that the temperature of the thermal treatment is in the above range, from the viewpoint of making the reaction of the argyrodite formation proceed sufficiently and obtaining a thermally-treated product (sintered product) that reflects the particle shape of the raw material. The duration of the thermal treatment can be appropriately adjusted according to the composition of the second raw material powder, the temperature of the thermal treatment and the like. The duration of the thermal treatment can be the same as the duration of the thermal treatment of the first raw material powder.

The pulverization of the thermally-treated product (sintered product) obtained by the thermal treatment of the second raw material powder is performed so that a pulverized product having a median diameter $D_{50}$ of 0.10 µm or more and 2.0 µm or less can be obtained. Thus, the sulfide solid electrolyte of the present invention can be obtained. The preferred ranges of $D_{10}$, $D_{50}$ and $D_{95}$ of the pulverized product are the same as the preferred ranges of the $D_{10}$, $D_{50}$ and $D_{95}$ of the sulfide solid electrolyte of the present invention.

The pulverization of the thermally-treated product (sintered product) obtained by the thermal treatment of the second raw material powder can be performed in the same manner as in the pulverization in step (1-2) of the first embodiment.

After the pulverization, the pulverized product may be classified using a sieve having a predetermined opening size. The pulverization conditions (for example, the rotation speed of the pulverizer, the process number of the pulverization treatment, the duration of the pulverization treatment, the energy applied to the thermally-treated product and the like), the opening size of the sieve used for classification and the like can be appropriately adjusted according to the $D_{50}$ of the pulverized product to be obtained.

The pulverized product obtained in step (2-2) may be directly used as the sulfide solid electrolyte of the present invention without a further treatment, or may be subjected to a desired treatment and then used as the sulfide solid electrolyte of the present invention.

EXAMPLES

In each of the Examples, the characteristics of the solid electrolyte were evaluated according to the following methods.

<Composition>

The solid electrolyte sample obtained in each of the Examples was completely dissolved and the elemental composition of the sample was analyzed by ICP emission spectrometry.

<Crystal Phase>

The crystal phase of the solid electrolyte sample was analyzed by an X-ray diffraction method (XRD, Cu source) to obtain an X-ray diffraction pattern. In the X-ray diffraction method, an XRD apparatus "Smart Lab" manufactured by Rigaku Corporation was used under the conditions of scanning axis: 2θ/θ, scanning range: 10 to 140 deg, step size: 0.01 deg, and scanning rate: 1 deg/min. In Examples 1 to 3, the X-ray diffraction was performed in a cell unexposed to air. In Example 4, a few drops of liquid paraffin were dropped onto the solid electrolyte in an argon atmosphere, and then the X-ray diffraction was performed in the atmosphere.

<$D_{10}$, $D_{50}$ and $D_{95}$>

The particle size distribution of the solid electrolyte was measured by a laser diffraction scattering particle size distribution measurement method, according to the following procedure. Using an automatic sample feeder for a laser diffraction particle size distribution measuring device ("Microtrac SDC" manufactured by NIKKISO CO., LTD.), 30 W ultrasonic waves were applied for 60 seconds to the measurement sample containing the solid electrolyte, with the flow velocity of the measurement sample containing the solid electrolyte set to 50%. Then, the particle size distribution was measured using a laser diffraction particle size distribution measuring device "MT3000II" manufactured by NIKKISO CO., LTD. From the obtained chart representing the volume-based particle size distribution, the particle sizes at the cumulative volumes of 10 vol %, 50 vol % and 95 vol % were determined as $D_{10}$, $D_{50}$ and $D_{95}$, respectively. When $D_{10}$, $D_{50}$ and $D_{95}$ were measured, the organic solvent was passed through a 60 μm filter, the solvent refractive index was 1.50, the particle transmittance condition was "transmissive", the particle refractive index was 1.59, the shape was "non-spherical", the measurement range was 0.133 μm to 704.0 μm, and the measurement duration was 10 seconds. The measurement was thus performed twice, and the average values of the obtained measured values were used as $D_{10}$, $D_{50}$ and $D_{95}$.

The measurement sample containing the solid electrolyte was prepared as follows. First, 0.3 g of the solid electrolyte and 5.7 g of liquid containing a dispersion agent (mass of toluene: mass of dispersion agent (SN dispersant 9228 manufactured by San Nopco Ltd.)=19:1 (mass ratio)) were manually mixed. A slurry containing the solid electrolyte was thus prepared. Next, 6 mL of the slurry containing the solid electrolyte was placed into an organic solvent (toluene) to prepare a measurement sample containing the solid electrolyte.

The $D_{10}$, $D_{50}$ and $D_{95}$ of the raw material powder of the solid electrolyte were measured in the same manner as described above except that the measurement sample containing the raw material powder was used. The measurement sample containing the raw material powder was prepared as follows. First, as will be described later, a slurry containing the raw material powder (raw material slurry) was prepared. Then, a few drops of a dispersion agent (SN dispersant 9228 manufactured by San Nopco Ltd.) were added dropwise to an organic solvent (toluene), and then a few drops of the slurry containing the raw material powder were added dropwise. Thus, a measurement sample containing the raw material powder was prepared.

<BET Specific Surface Area>

The BET specific surface area was calculated by the following method. Using a specific surface area measuring device "BELSORP-miniII" manufactured by Microtrac BEL Corp., the adsorption and desorption isotherms were measured by a gas adsorption method at the constant volume, and the BET specific surface area was calculated by the multipoint method. The pretreatment was performed at 120° C. for 30 minutes or more in a reduced pressure environment. He and $N_2$ were used as the purge gas and the adsorbate, respectively.

<True Density>

The true density was calculated by the gas replacement method using a true density evaluation device "BELPycno" manufactured by Microtrac BEL Corp. The pretreatment was performed 5 times by purging. For the measurement, a 10-cc alumina cell was used, and the sample was filled to about 70% of the cell.

<Cs Value>

The particle size distribution was measured using a laser diffraction particle size distribution measuring device "MT3000II" manufactured by NIKKISO CO., LTD. in the same manner as in the measurement of $D_{10}$, $D_{50}$ and $D_{95}$. From the obtained chart representing the volume-based particle size distribution, the CS value was calculated.

Example 1

(1) Production of Intermediate

A $Li_2S$ powder, a $P_2S_5$ powder, a LiCl powder and a LiBr powder were each weighed so that the composition would be $Li_{5.4}PS_{4.4}Cl_{0.8}Br_{0.8}$ and the total amount would be 5 g, and the mixture was pulverized and mixed in toluene for 15 hours using a ball mill. Thus, a raw material slurry was obtained. The results of the evaluation of the obtained raw material slurry are shown in Table 1.

After the obtained raw material slurry was heated and dried in vacuum, the resulting raw material powder was filled in a carbon container and subjected to thermal treatment in a tubular electric furnace at 300° C. for 4 hours, and then at 500° C. for 4 hours with the temperature rise and fall rate of 200° C./hour while hydrogen sulfide gas was circulated at 1.0 L/min.

The thermally-treated product (sintered product) thus obtained was pulverized to obtain a powdery intermediate. The pulverization was performed in two stages using a planetary ball mill (manufactured by Fritsch Co., Ltd). In the first pulverization step, a planetary ball mill (manufactured by Fritsch Co., Ltd) was used. In a zirconia container having a capacity of 80 cm³, 5 g of the solid electrolyte (thermally-treated product), 10 g of dehydrated heptane and 90 g of 5-mm $ZrO_2$ balls were placed, and the mixture was pulverized at a rotation rate of 100 rpm for 3 hours. The obtained slurry was dried in vacuum to obtain a pulverized product of the first step. The second pulverization step was performed using the obtained pulverized product of the first step. In the second pulverization step, 2 g of the solid electrolyte (pulverized product of the first step), 0.06 g of dispersion agent (butyl acetate), 10 g of super dehydrated toluene and 90 g of 0.8-mm $ZrO_2$ balls were placed in a zirconia container having a capacity of 80 cc, and the mixture was pulverized at a rotation rate of 100 rpm for 1 hour. The obtained slurry was subjected to ball separation and solid-liquid separation, dried in vacuum at 80° C., and then sized through a sieve having a mesh size of 53 μm to obtain a powdery intermediate.

Weighing, mixing, installation in an electric furnace, retrieval from the electric furnace, pulverization, and sizing processes were all performed in a glovebox replaced with sufficiently dried Ar gas (dew point of −60° C. or less).

(2) Evaluation of Intermediate Characteristics

The results of the evaluation of the intermediate are shown in Table 1.

In the X-ray diffraction pattern measured using CuKα1 irradiation, the intermediate had peaks derived from the argyrodite-type crystal phase.

(3) Thermal Treatment of Intermediate

The intermediate was subjected to thermal treatment at 250° C. for 2 hours in an environment in which argon gas was flowed at a flow rate of 1 L/min.

(4) Evaluation of Characteristics of Thermally-Treated Product

The results of the evaluation of the thermally-treated product are shown in Table 1.

In the X-ray diffraction pattern measured using CuKα1 irradiation, the thermally-treated product had peaks derived from the argyrodite-type crystal phase.

(5) Pulverization of Thermally-Treated Product

The thermally-treated product was pulverized as follows to obtain a pulverized product. In a zirconia container having a capacity of 80 cc, 2 g of the thermally-treated product, 0.06 g of dispersion agent (butyl acetate), 10 g of super dehydrated toluene and 90 g of 0.8-mm $ZrO_2$ balls were placed, and the mixture was pulverized at a rotation rate of 100 rpm for 10 minutes. The obtained slurry was subjected to ball separation and solid-liquid separation, dried in vacuum at 80° C., and then sized through a sieve having a mesh size of 53 μm to obtain a pulverized product of the thermally-treated product.

(6) Evaluation of Characteristics of Pulverized Product

Figure 4:
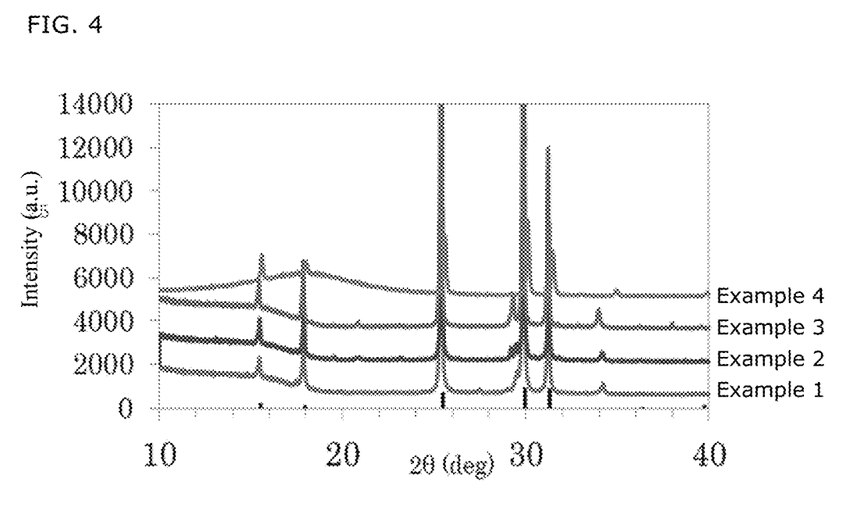
FIG. 4 is a diagram showing the X-ray diffraction patterns of the sulfide solid electrolytes produced in Examples 1 to 4.

The results of the evaluation of the pulverized product are shown in Table 1 and FIG. 4.

As shown in FIG. 4, in the X-ray diffraction pattern measured using CuKα1 irradiation, the pulverized product had peaks derived from the argyrodite-type crystal phase.

Example 2

The same operation as in Example 1 was performed except that the temperature of the thermal treatment of the intermediate was changed to 300° C. The results of the same evaluation as in Example 1 are shown in Table 1 and FIG. 4.

As shown in FIG. 4, in the X-ray diffraction pattern measured using CuKα1 irradiation, the pulverized product had peaks derived from the argyrodite-type crystal phase.

In the X-ray diffraction pattern measured using CuKα1 irradiation, the intermediate and the thermally-treated product also had peaks derived from the argyrodite-type crystal phase.

Example 3

(1) Production of Pulverized Product

A $Li_2S$ powder, a $P_2S_5$ powder, a LiCl powder and a LiBr powder were each weighed so that the composition would be $Li_{5.4}PS_{4.4}Cl_{0.8}Br_{0.8}$ and the total amount would be 5 g, and the mixture was pulverized and mixed for 2 hours using a planetary ball mill. Thus, a raw material powder was obtained. In a zirconia container having a capacity of 80 cc, 2 g of the resulting raw material powder, 0.06 g of dispersion agent (butyl acetate), 10 g of super dehydrated toluene and 90 g of 0.8-mm $ZrO_2$ balls were placed, and the mixture was pulverized at a rotation rate of 100 rpm for 1 hour. The obtained slurry was separated from the balls, dried in vacuum at 80° C., and then sized through a sieve of 53 μm to obtain raw material powder. The characteristics of the obtained raw material powder ($D_{10}$, $D_{50}$ and $D_{95}$) were evaluated. The results are shown in Table 2.

The resulting raw material powder was filled in a carbon container and thermally-treated in a tubular electric furnace at 300° C. for 4 hours, and then at 400° C. for 4 hours with the temperature rise and fall rate of 200° C./hour while hydrogen sulfide gas was circulated at 1.0 L/min.

The thermally-treated product (sintered product) thus obtained was pulverized to obtain a pulverized product. In a zirconia container having a capacity of 80 cc, 2 g of the thermally-treated product, 0.06 g of dispersion agent (butyl acetate), 10 g of super dehydrated toluene and 90 g of 0.8-mm $ZrO_2$ balls were placed, and the mixture was pulverized at a rotation rate of 100 rpm for 10 minutes. The obtained slurry was subjected to ball separation and solid-liquid separation, dried in vacuum at 80° C., and then sized through a sieve of 53 μm to obtain a pulverized product.

Weighing, mixing, installation in an electric furnace, retrieval from the electric furnace, pulverization, and sizing processes were all performed in a glovebox replaced with sufficiently dried Ar gas (dew point of −60° C. or less).

(2) Evaluation of Characteristics of Pulverized Product

The results of the evaluation of the pulverized product are shown in Table 2 and FIG. 4.

As shown in FIG. 4, in the X-ray diffraction pattern measured using CuKα1 irradiation, the pulverized product had peaks derived from the argyrodite-type crystal phase.

Example 4

The same operation as in Example 3 was performed except that the composition was changed to $Li_{5.8}PS_{4.8}Cl_{1.2}$, the raw material powder was pulverized at a rotation rate of 100 rpm for 2 hours, and the thermally-treated product (sintered product) was pulverized at a rotation rate of 100 rpm for 30 minutes. The results of the same evaluation as in Example 3 are shown in Table 2 and FIG. 4.

As shown in FIG. 4, in the X-ray diffraction pattern measured using CuKα1 irradiation, the pulverized product had peaks derived from the argyrodite-type crystal phase.

TABLE 1

|  |  | Raw material powder | Intermediate powder | Thermally-treated product | Pulverized product |
|---|---|---|---|---|---|
| Example 1 | Composition | — | | $Li_{5.4}PS_{4.4}Cl_{0.8}Br_{0.8}$ | |
|  | Crystal phase | — | | Argyrodite-type crystal phase | |
|  | $D_{10}$ (μm) | — | 0.42 | 0.49 | 0.39 |
|  | $D_{50}$ (μm) | 4.58 | 0.72 | 1.04 | 0.65 |
|  | $D_{95}$ (μm) | 16.55 | 1.66 | 3.99 | 1.46 |
|  | BET specific surface area ($m^2$/g) | — | 12.0 | 6.9 | 9.3 |
|  | True density (g/$cm^3$) | — | 2.1 | 2.1 | 2.1 |
|  | CS VALUE ($m^2$/$cm^3$) | — | 8.9 | 6.6 | 9.8 |
|  | (A × B)/C | — | 2.8 | 2.2 | 2.0 |

TABLE 1-continued

|  |  | Raw material powder | Intermediate powder | Thermally-treated product | Pulverized product |
|---|---|---|---|---|---|
| Example 2 | Composition | — | | $Li_{5.4}PS_{4.4}Cl_{0.8}Br_{0.8}$ | |
|  | Crystal phase | — | | Argyrodite-type crystal phase | |
|  | $D_{10}$ (μm) | — | 0.42 | 2.12 | 0.40 |
|  | $D_{50}$ (μm) | 4.58 | 0.72 | 40.73 | 0.67 |
|  | $D_{95}$ (μm) | 16.55 | 1.66 | 108.8 | 1.60 |
|  | BET specific surface area ($m^2$/g) | — | 12.0 | 5.8 | 8.0 |
|  | True density (g/$cm^3$) | — | 2.1 | 2.1 | 2.1 |
|  | CS VALUE ($m^2/cm^3$) | — | 8.9 | 0.8 | 9.5 |
|  | (A × B)/C | — | 2.8 | 15.3 | 1.8 |

TABLE 2

|  |  | Raw material powder | Pulverized product |
|---|---|---|---|
| Example 3 | Composition | — | $Li_{5.4}PS_{4.4}Cl_{0.8}Br_{0.8}$ |
|  | Crystal phase | — | Argyrodite-type crystal phase |
|  | $D_{10}$ (μm) | 0.16 | 0.43 |
|  | $D_{50}$ (μm) | 0.29 | 0.72 |
|  | $D_{95}$ (μm) | 0.63 | 1.63 |
|  | BET specific surface area ($m^2$/g) | — | 7.5 |
|  | True density | — | 2.1 |
|  | ACS VALUE ($m^2/cm^3$) | — | 8.8 |
|  | (A × B)/C | — | 1.8 |
| Example 4 | Composition | — | $Li_{5.8}PS_{4.8}Cl_{1.2}$ |
|  | Crystal phase | — | Argyrodite-type crystal phase |
|  | $D_{10}$ (μm) | 0.14 | 0.34 |
|  | $D_{50}$ (μm) | 0.24 | 0.59 |
|  | $D_{95}$ (μm) | 0.48 | 1.76 |
|  | BET specific surface area ($m^2$/g) | — | 10.2 |
|  | True density | — | 1.8 |
|  | CS VALUE ($m^2/cm^3$) | — | 6.0 |
|  | (A × B)/C | — | 1.7 |

As shown in Tables 1 and 2, each of Examples 1 to 4 demonstrates that a powder of a sulfide solid electrolyte containing Li, P and S as well as an argyrodite-type crystal phase and having a $D_{50}$ of 0.10 μm or more and 2.0 μm or less and a value (A×B)/C of 1.0 or more and 2.5 or less was obtained.

The invention claimed is:

1. A sulfide solid electrolyte, comprising lithium (Li), phosphorus (P) and sulfur (S) elements, wherein the sulfide solid electrolyte has: a median diameter $D_{50}$, which is a particle size at a cumulative volume of 50 vol % in a volume-based particle size distribution measured by a laser diffraction scattering particle size distribution measurement method, of 0.10 μm or more and 2.0 μm or less; a BET specific surface area of 2.0 $m^2$/g or more and 20 $m^2$/g or less; and a value of the formula: (A×B)/C, wherein A represents the BET specific surface area ($m^2$/g), B re presents a true density (g/$cm^3$), and C represents a CS value ($m^2/cm^3$), of 1.5 or more and 2.1 or less.

2. The sulfide solid electrolyte according to claim 1, wherein:
the content of the lithium (Li) element is 41 mol % or more and 50 mol % or less, based on the total molar amount of constituent elements of the sulfide solid electrolyte;
the content of the phosphorus (P) element is 7.0 mol % or more and 20 mol % or less, based on the total molar amount of constituent elements of the sulfide solid electrolyte; and
the content of the sulfur (S) element is 31 mol % or more and 43 mol % or less, based on the total molar amount of constituent elements of the sulfide solid electrolyte.

3. The sulfide solid electrolyte according to claim 1, further comprising at least one halogen (X) element.

4. The sulfide solid electrolyte according to claim 3, wherein the at least one halogen (X) element comprises at least one of chlorine (Cl) and bromine (Br) elements.

5. The sulfide solid electrolyte according to claim 3, wherein the content of the at least one halogen (X) element is 3.7 mol % or more and 19 mol % or less, based on the total molar amount of constituent elements of the sulfide solid electrolyte.

6. The sulfide solid electrolyte according to claim 1, wherein, in a X-ray diffraction pattern measured with CuKα1 radiation, peaks are present at positions of 2θ=25.19°±1.00° and 29.62°±1.00°.

7. The sulfide solid electrolyte according to claim 6, wherein, in the X-ray diffraction pattern, a peak is present at a position selected from 2θ=15.34°±1.00°, 17.74°±1.00°, 30.97°±1.00°, 44.37°±1.00°, 47.22°±1.00° and 51.70°±1.00°.

8. The sulfide solid electrolyte according to claim 1, wherein:
the sulfide solid electrolyte comprises a crystal phase having an argyrodite-type crystal structure; and
the crystal phase has a composition represented by the following formula:

$$Li_aPS_bX_c$$

wherein X represents at least one halogen element, a represents 3.0 or more and 6.5 or less, b represents 3.5 or more and 5.5 or less, and c represents 0.50 or more and 3.0 or less.

9. An electrode composite material, comprising the sulfide solid electrolyte according to claim 1 and an active material.

10. A slurry, comprising the sulfide solid electrolyte according to claim 1 and a dispersion medium.

11. A battery, comprising a positive electrode layer, a negative electrode layer and a solid electrolyte layer located between the positive electrode layer and the negative electrode layer,
wherein the solid electrolyte layer comprises the sulfide solid electrolyte according to claim 1.

12. A method of producing the sulfide solid electrolyte according to claim 1, the method comprising the steps of:
(1-1) providing as an intermediate a sulfide solid electrolyte that comprises lithium (Li), phosphorus (P) and sulfur (S) elements and has a median diameter $D_{50}$ of 0.10 μm or more and 2.0 μm or less, a BET specific surface area of 3.0 m²/g or more and 25 m²/g or less, and a value of the formula: (A×B)/C, wherein A represents the BET specific surface area (m²/g), B represents a true density (g/cm³), and C represents a CS value (m²/cm³), of more than 2.5 and 5.0 or less, and
(1-2) subjecting the intermediate to thermal treatment and pulverizing the resulting thermally-treated product to obtain a pulverized product that has a median diameter $D_{50}$ of 0.10 μm or more and 2.0 μm or less.

13. A method of producing the sulfide solid electrolyte according to claim 1, the method comprising the steps of:
(2-1) providing a raw material powder that comprises lithium (Li), phosphorus (P) and sulfur (S) elements and has a median diameter $D_{50}$ of 0.10 μm or more and 2.0 μm or less and a $D_{95}$ of 0.30 μm or more and 5.0 μm or less; and
(2-2) subjecting the raw material powder to thermal treatment and pulverizing the resulting thermally-treated product to obtain a pulverized product that has a median diameter $D_{50}$ of 0.10 μm or more and 2.0 μm or less.

* * * * *